(12) United States Patent
Ohta et al.

(10) Patent No.: US 7,952,827 B2
(45) Date of Patent: May 31, 2011

(54) HEAT-ASSISTED MAGNETIC RECORDING METHOD USING EDDY CURRENT AND HEAD FOR HEAT-ASSISTED MAGNETIC RECORDING

(75) Inventors: Naoki Ohta, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 982 days.

(21) Appl. No.: 11/780,973

(22) Filed: Jul. 20, 2007

(65) Prior Publication Data
US 2008/0024896 A1 Jan. 31, 2008

(30) Foreign Application Priority Data

Jul. 27, 2006 (JP) .................. 2006-204511

(51) Int. Cl.
*G11B 5/02* (2006.01)
*G11B 5/40* (2006.01)
(52) U.S. Cl. ................ 360/59; 360/125.32; 360/125.02; 360/125.31; 360/125.75
(58) Field of Classification Search .................. None
See application file for complete search history.

(56) References Cited

U.S. PATENT DOCUMENTS

| | | | | |
|---|---|---|---|---|
| 5,452,164 | A * | 9/1995 | Cole et al. | 360/317 |
| 6,950,280 | B2 * | 9/2005 | Rea et al. | 360/125.31 |
| 7,035,046 | B1 * | 4/2006 | Young et al. | 360/125.75 |
| 7,068,453 | B2 * | 6/2006 | Terris et al. | 360/59 |
| 7,133,230 | B2 * | 11/2006 | Saga et al. | 360/59 |
| 7,177,115 | B2 * | 2/2007 | Shiroishi | 360/97.01 |
| 7,649,713 | B2 * | 1/2010 | Ota et al. | 360/125.32 |
| 7,782,566 | B2 * | 8/2010 | Shiroishi | 360/125.74 |
| 2003/0099054 | A1 * | 5/2003 | Kamijima | 360/59 |
| 2004/0047073 | A1 * | 3/2004 | Kasajima et al. | 360/126 |
| 2004/0201920 | A1 * | 10/2004 | Koide et al. | 360/128 |
| 2004/0252591 | A1 | 12/2004 | Ju et al. | |
| 2005/0047015 | A1 * | 3/2005 | Matono et al. | 360/126 |
| 2005/0088780 | A1 * | 4/2005 | Sasaki et al. | 360/123 |

FOREIGN PATENT DOCUMENTS

| | | |
|---|---|---|
| JP | A-2000-173093 | 6/2000 |
| JP | A-2001-255254 | 9/2001 |
| JP | A-2004-252591 | 9/2004 |
| JP | A-2004-253043 | 9/2004 |

* cited by examiner

*Primary Examiner* — Dismery E Mercedes
(74) *Attorney, Agent, or Firm* — Oliff & Berridge, PLC

(57) ABSTRACT

A heat-assisted magnetic head that can efficiently and locally heat a magnetic recording medium. The head includes a heating coil element, and a write head element for writing data signals by generating a signal magnetic field, and a read head element for reading data signals by sensing the signal magnetic field. The heating coil element comprises a main heating magnetic pole layer, an auxiliary heating magnetic pole layer, and a heating coil layer for generating a magnetic flux in the main heating magnetic pole layer and the auxiliary heating magnetic pole layer and passing through at least between the main heating magnetic pole layer and the auxiliary heating magnetic pole layer. The read head element, heating coil element, and the write head element are stacked in this order from an element-formed surface of a substrate.

5 Claims, 7 Drawing Sheets

HEAT-ASSISTED MAGNETIC RECORDING METHOD USING EDDY CURRENT AND HEAD FOR HEAT-ASSISTED MAGNETIC RECORDING

PRIORITY CLAIM

This application claims priority from Japanese patent application No. 2006-204511, filed on Jul. 27, 2006, which is incorporated herein by reference.

BACKGROUND OF THE INVENTION

1. Field of the Invention

The present invention relates to a magnetic recording method of writing data signals with a heat-assisted magnetic recording using an eddy current and thin-film magnetic head for the heat-assisted magnetic recording using the eddy current, a head gimbal assembly (HGA) with the thin-film magnetic head, and a magnetic recording/reproducing apparatus with the HGA.

2. Description of the Related Art

With the increasing capacity and decreasing size of a magnetic recording/reproducing apparatus such as a magnetic disk drive, further improvements of performance are required for the thin-film magnetic head. As the thin-film magnetic head, a composite-type thin-film magnetic head is widely used, which has a stacked structure of a magnetoresistive (MR) effect element for reading data signals from a magnetic recording medium such as a magnetic disk and an electromagnetic coil element for writing data signals, and the reading and the writing data signals are performed with using these elements to a magnetic recording media such as the magnetic disk.

Generally, the magnetic recording medium has a magnetically discontinuous layer where magnetic microparticles are gathered together. Usually, each of the magnetic microparticles has a single magnetic-domain structure, and one recording bit consists of a plurality of the magnetic microparticles. Therefore, for improving the recording density, irregularity in the boundary of the recording bit is required to be reduced by decreasing the size (volume) of the magnetic microparticle. However, a problem is likely to occur that decrease of the size of the magnetic microparticle causes thermal stability of the magnetization to be degraded.

As a measure of the thermal stability problem, it may be possible that the $K_U$, which is a magnetic anisotropy energy in the microparticle, is increased concurrently. However, the increase in the $K_U$ causes the increase in coercive force of the magnetic recording medium. On the other hand, the write magnetic field intensity of the magnetic head is limited by the amount of the saturation magnetic flux density of the soft-magnetic material which constitutes a magnetic pole in the head. Therefore, the head cannot write data signals to the medium when the coercive force of the magnetic recording medium exceeds a permitted value which determined with the limit of the write magnetic field intensity.

As a further measure of this, a heat-assisted magnetic recording technique is proposed, in which the magnetic head writes data signals to the magnetic recording medium formed of a material with the large $K_U$ value, by reducing the coercive force of the medium with heat supplied to the medium just before the write field is applied.

At present, as a heating method of the magnetic recording medium in the a heat-assisted magnetic recording technique, a method of emitting a near-field light generated by a laser to the magnetic recording medium is mainly proposed. For example, Japanese patent publication No. 2001-255254A describes a near-field light probe which has a metal scatterer with strobilus shape formed on a substrate and a dielectric material film formed around the metal scatterer. And U.S. Pat. No. 7,133,230 describes a scatterer as a near-field light probe, which is formed in contact with the main magnetic pole of a head for a perpendicular magnetic recording in such a way that the irradiated surface of the scatterer is perpendicular to the surface of the medium. As means for providing this laser, U.S. Pat. No. 7,133,230 uses a semiconductor laser element equipped in the heads. And, for example, a technique described in Japanese patent publication No. 2000-173093A uses an optical fiber for provision of the laser.

Meanwhile, as a other method of heating the magnetic recording medium in the a heat-assisted magnetic recording technique, for example, US patent Publication No. 2004-252591A describes a technique which indirectly heats the magnetic recording medium using a heating element to heat a inductive write head layer. And, Japanese patent publication No. 2004-253043A describes a technique which heats the magnetic recording layer of the magnetic disk with heating a spacer by applying current between two yokes at the head which has two yokes and a spacer filling in a magnetic gap between two magnetic poles located in the each tip of its yoke.

However, a lot of technical difficulties occur and there is a problem in the heat-assisted magnetic recording technique using the laser or the heat from the heating element.

Certainly, in the heat-assisted magnetic recording technique using the laser, a suitable heat-assisted is enabled with efficiently and locally heating the magnetic recording medium. However, in order to realize the thin-film magnetic head for the heat-assisted magnetic recording, generally, it is necessary to form a microscopic optical system part which requires high position accuracy and dimension accuracy, which become a great task in manufacture process. And in a configuration of the typical thin-film magnetic head that the element-formed surface and the opposed-to-medium surface are perpendicular to each other, it is the great difficulty in a design to set a laser source so as to get light paralleled to the element-formed surface.

Also, in the heat-assisted magnetic recording technique using heat from the heating element, as the magnetic recording medium is heated with simple heat conduction, it is difficult to heat a predetermined position of the magnetic recording medium to sufficient temperature within a predetermined time. Furthermore, the problem that a thermal pole tip protrusion (TPTP) occurs and an air bearing surface (ABS) is changed by out of control has happened.

BRIEF SUMMARY OF THE INVENTION

Therefore, it is an object of the present invention to provide a heat-assisted magnetic recording method which can efficiently and locally heat the magnetic recording medium without a head which needs a great task in manufacture process. Further, it is an object of the present invention to provide a thin-film magnetic head to realize such a heat-assisted magnetic recording methods. Further, it is an object of the present invention to provide a HGA equipped the thin-film magnetic head and the magnetic disk drive equipped the HGA.

Here, some terms will be defined before explaining the present invention. In a layered structure of elements formed on an element-formed surface of the slider substrate, a component that is closer to the element-formed surface than a standard layer is defined to be a "below" or "lower" in relation to the standard layer, and a component that is in the stacking direction side of the standard layer is defined to be "above" or "upper" in relation to the standard layer.

According to the present invention, a heat-assisted magnetic recording method is provided, which comprises steps of: heating a portion of a magnetic recording layer included in a magnetic recording medium by generating an eddy current with applying a high-frequency magnetic field to said portion or a portion near said portion; applying a write magnetic field to at least a part of said portion on a state temporarily reducing a coercive force of said portion; and writing data to said magnetic recording medium.

In the heat-assisted magnetic recording method, heating the portion of the magnetic recording layer, which data should be written in, with the eddy current induced by the locally converged high-frequency magnetic field, the heating efficiently performs locally and instantly. Further, it can perform without the optical system such as a laser source a lens system and a near-field light generation element.

Furthermore, it is also preferable that said high-frequency magnetic field is applied to perpendicular a surface of said magnetic recording medium. In this case, as the eddy current inducts in a surface of such as the magnetic recording layer or the soft-magnetic backing layer, these are heated very efficiently.

Furthermore, it is also preferable that a portion of said magnetic recording layer is heated by applying the high-frequency magnetic field to a portion of a soft-magnetic backing layer which is near the portion of said magnetic recording layer. In this case, it is also preferable that a discrete track medium or a patterned medium is used as said magnetic recording medium.

Furthermore, it is also preferable that the application of said high-frequency magnetic field is performed with using a write coil element for a perpendicular magnetic recording which is used when said write magnetic field is applied.

According to the present invention, a thin-film magnetic head for a heat-assisted magnetic recording is provided, which comprises: a high-frequency magnetic field generation element for heating a portion of a magnetic recording medium in writing by generating an eddy current with applying a high-frequency magnetic field to said portion or a portion near said portion; and a write head element for writing data signals by generating the signal magnetic field.

The heating efficiently performs locally and instantly with heating the portion of the magnetic recording layer, which data should be written in, with an eddy current using the thin-film magnetic head for a heat-assisted magnetic recording. As a result, it contributes not only the increasing capacity and decreasing size at the heat-assisted magnetic recording but also the reduction of the recording time.

Furthermore, in the thin-film magnetic head for the heat-assisted magnetic recording according to the present invention, it is also preferable that said high-frequency magnetic field generation element is a heating coil element comprising: a main heating magnetic pole layer for applying the high-frequency magnetic field to perpendicular the surface of the magnetic disk; an auxiliary heating magnetic pole layer of which one end is near one end of said main heating magnetic pole layer, and other end is magnetically connected to other end of said main heating magnetic pole layer; and a heating coil layer for generating a magnetic flux in said main heating magnetic pole layer and said auxiliary heating magnetic pole layer and passing through at least between said main heating magnetic pole layer and said auxiliary heating magnetic pole layer.

Furthermore, it is also preferable that said thin-film magnetic head further comprises a read head element for reading data signals by sensing a signal magnetic field, and said read head element, said high-frequency magnetic field generation element, and said write head element are stacked in this order from an element-formed surface of a substrate.

Furthermore, it is also preferable that said write head element is a writing coil element for a perpendicular magnetic recording comprising: a main magnetic pole layer for applying the write magnetic field to perpendicular the surface of the magnetic recording medium; an auxiliary magnetic pole layer of which one end is near one end of said main magnetic pole layer, and other end is magnetically connected to other end of said main magnetic pole layer; and a write coil layer for generating a magnetic flux in said main magnetic pole layer and said auxiliary magnetic pole layer and passing through at least between said main magnetic pole layer and said auxiliary magnetic pole layer.

According to the present invention, a HGA is provided, which comprises: the above-described thin-film magnetic head; a support mechanism for supporting said thin-film magnetic head; trace conductors for said write head element; trace conductors for said read head element when said thin-film magnetic head comprises said read head element; and trace conductors for high-frequency magnetic field generation element.

According to the present invention, a magnetic recording/reproducing apparatus is provided, which comprises: at least one above-described HGA; at least one magnetic recording medium; and a recording/reproducing and heating control circuit for controlling read and write operations of said thin-film magnetic head to said at least one magnetic recording medium and for controlling a heat operation of said high-frequency magnetic field generation element.

Furthermore, it is also preferable that said at least one magnetic recording medium comprises a magnetic recording layer and a soft-magnetic backing layer set below said magnetic recording layer. Further, in this case, it is also preferable that said at least one magnetic recording medium is a discrete track medium or a patterned medium.

According to the heat-assisted magnetic recording method of the present invention, it can efficiently and locally heat the magnetic recording medium without a head which needs a great task in manufacture process. Also according to the thin-film magnetic head of the present invention, a HGA with the thin-film magnetic head and a magnetic recording/reproducing apparatus with the HGA, these can realize such the heat-assisted magnetic recording method.

Further objects and advantages of the present invention will be apparent from the following description of preferred embodiments of the invention as illustrated in the accompanying drawings. Some elements have been designated with same reference numerals in the different drawings.

DETAILED DESCRIPTION OF THE INVENTION

Figure 1:
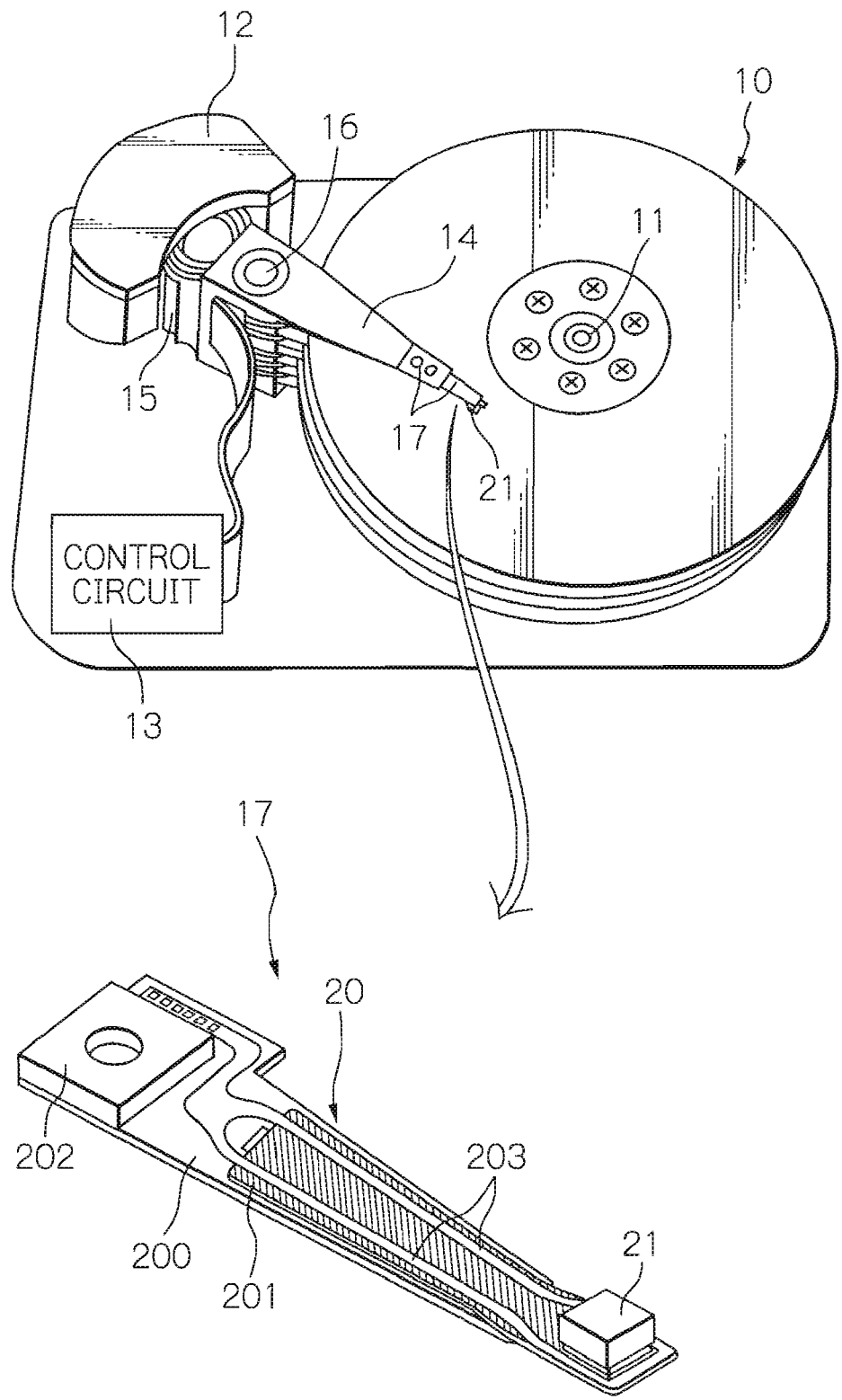
FIG. 1 shows a perspective view schematically illustrating a major portion of an embodiment of the magnetic recording/reproducing apparatus and the HGA according to the present invention.

FIG. 1 shows a perspective view schematically illustrating a major portion of an embodiment of the magnetic recording/reproducing apparatus and the HGA according to the present invention. Here, in the oblique view of the HGA, the opposed-to-medium surface of the HGA is shown by the top.

In this figure, the magnetic recording/reproducing apparatus is the magnetic disk drive, reference numeral 10 indicates a plurality of magnetic disks (magnetic recording media) rotating around a rotational axis of a spindle motor 11, 12 indicates an assembly carriage device for positioning a thin-film magnetic head (slider) 21 on a track, and 13 indicates a recording/reproducing and heating control circuit for controlling read/write operations of the thin-film magnetic head and controlling a heating coil element for heat-assisted magnetic recording which will be described below more preciously, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A thin-film magnetic head (slider) 21 is mounted on each HGA 17 in such a way as to be opposed to the surface of the magnetic disk 10. The each number of the magnetic disks 10, the drive arms 14, the HGAs 17 and the thin-film magnetic heads (sliders) 21 can also be only one.

The HGA 17 is constructed by fixing a thin-film magnetic head (slider) 21 on an end portion of a suspension 20 and by electrically connecting one end of a wiring member 203 to signal electrodes of the thin-film magnetic head 21. The suspension 20 is mainly constructed of a load beam 200, a flexure 201 with elasticity fixed and supported on this load beam 200, a base plate 202 provided on the base portion of the load beam 200, and the wiring member 203 that is made up of trace conductors and connection pads electrically connected to both ends of the trace conductors and is provided on the flexure 201.

It is obvious that the structure of the suspension in the HGA according to the present invention is not limited to the above-described one. Though not shown in the figures, it is also possible to attach a head drive IC chip at some midpoint of the suspension 20.

Figure 2:
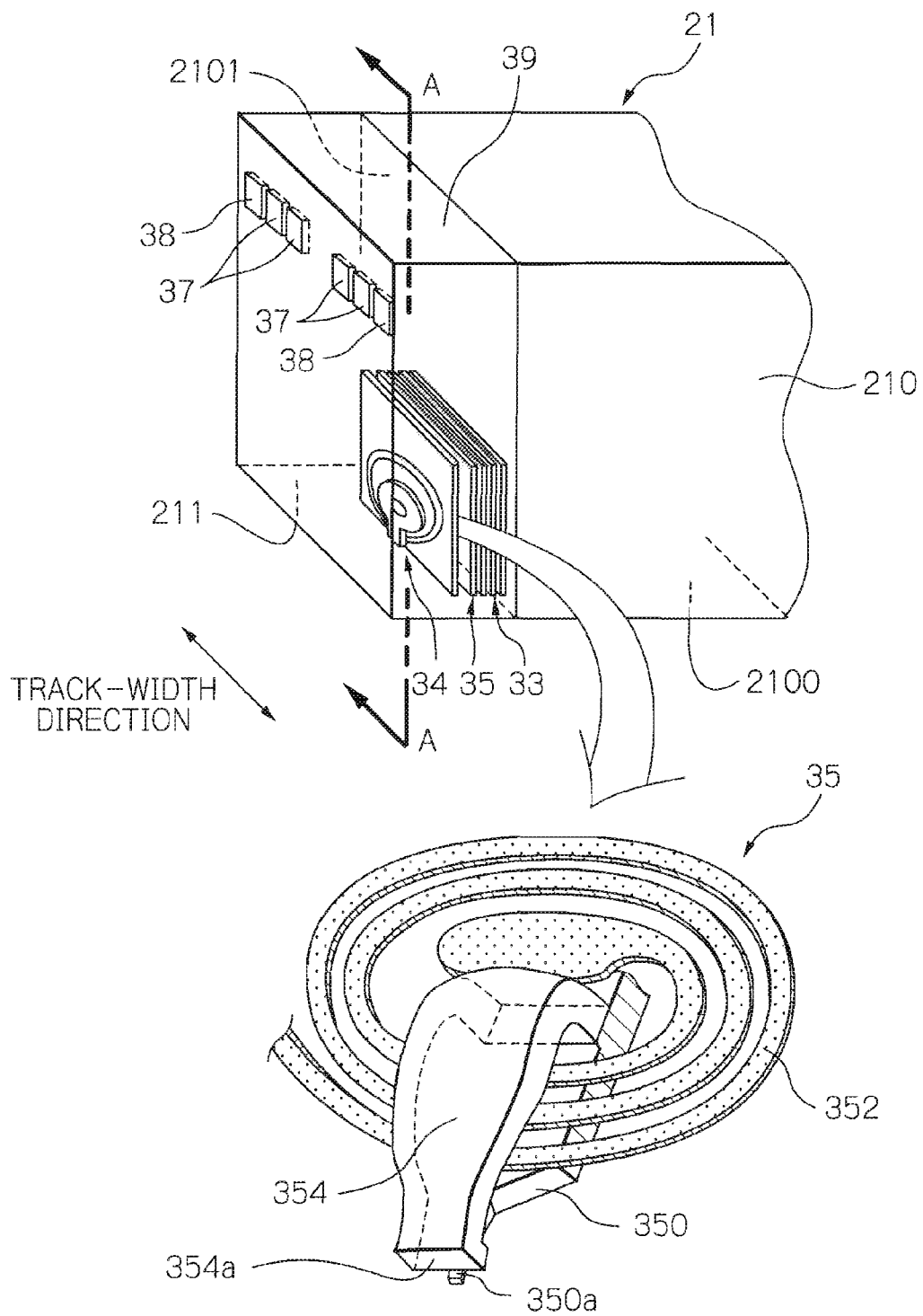
FIG. 2 shows a perspective view illustrating an embodiment of the thin-film magnetic head according to the present invention.

FIG. 2 shows a perspective view illustrating an embodiment of the thin-film magnetic head 21 according to the present invention.

As shown in FIG. 2, the thin-film magnetic head 21 is provided with: a slider substrate 210 having an air bearing surface (ABS) 2100 as an opposed-to-medium surface for obtaining an appropriate flying height and an element-formed surface 2101 perpendicular to the ABS 2100; an MR effect element 33 as the read head element for reading data signals by sensing a signal magnetic field, formed above/on the element-formed surface 2101; a heating coil element 35 which is a high-frequency magnetic field generation element to heat a portion of the magnetic disk by generating an eddy current with applying a high-frequency magnetic to at the portion or a portion near this portion in writing, formed above/on the element-formed surface 2101; a writing coil element 34 as the write head element for writing data signals by generating the signal magnetic field; an overcoat layer 39 formed on the element-formed surface 2101 in such a way as to cover the MR effect element 33, the heating coil element 35, and the writing coil element 34; four signal electrodes 37 exposed on the surface of the overcoat layer 39 and electrically connected to two MR effect elements 33 and two writing coil elements 34; and two signal electrodes 38 exposed on the surface of the overcoat layer 39 and electrically connected to each end of heating coil layer of the heating coil element 35.

The MR effect element 33, the heating coil element 35, and the writing coil element 34 are stacked in this order from the element-formed surface 2101. That is to say, these are positioned in this order from a leading side to a trailing side. This position, which will be explained later in detail, is a appropriate position for the heat-assisted magnetic recording method according to the present invention, but embodiments of this method is not limited this position. For example, it is possible that the heating coil element 35 may position just the leading side or just the trailing side.

One ends of the MR effect element 33, the heating coil element 35, and the writing coil element 34 reach a slider end surface 211 on the side of ABS 2100. The slider end surface 211 is a surface on the side of ABS 2100 of the thin-film magnetic head 21 and a surface of a portion except ABS 2100. During write and read operations, the thin-film magnetic head 21 hydrodynamically flies with a predetermined flying height above a rotating magnetic disk, and the ends of the HR effect element 33 and the writing coil element 34 become opposed to the magnetic disk via minute spacing, then the head 21 performs the read operation of data signals by sensing signal magnetic fields and the write operation of data signals by applying signal magnetic fields.

Here, in the case of writing this data signals, the high-frequency magnetic field generated from the heating coil 35 reaches the magnetic disk, and applies to perpendicular the surface of the magnetic disk, then generates the eddy current on one portion of the magnetic recording layer included in the magnetic disk or one portion of such as a soft-magnetic backing layer near this portion. Therefore, the coercive force of this portion temporarily decreases by heating this portion of the magnetic recording layer. It is possible to perform the heat-assisted magnetic recording by applying the write magnetic field using the writing coil element 34 to at least one part of this portion of the magnetic recording layer.

Here, in the heat-assisted magnetic recording method according to the present invention, heating with the eddy current induced by the locally converged high-frequency magnetic field, the heating efficiently performs locally and instantly. Further, it can perform without the optical system such as a laser source, a lens system and a near-field light generation element. Further, as the high-frequency magnetic field applies to perpendicular the surface of the magnetic disk, the eddy current inducts in a surface of such as the magnetic recording layer or the soft-magnetic backing layer, then these are heated very efficiently.

Also, as shown in FIG. 2, the heating coil element is a heating coil element which provided with: a main heating magnetic pole layer 350 for applying the high-frequency magnetic field to perpendicular the surface of the magnetic disk; an auxiliary heating magnetic pole layer 354 of which one end is near one end of the main heating magnetic pole layer 350, and other end is magnetically connected to other end of the main heating magnetic pole layer 350; and a heating coil layer 352 for generating a magnetic flux in the main heating magnetic pole layer 350 and the auxiliary heating magnetic pole layer 354 and passing through at least between the main heating magnetic pole layer 350 and the auxiliary heating magnetic pole layer 354.

The main heating magnetic pole layer 350 is a magnetic path to guide and converge the magnetic flux excited by currents flowing through the heating coil layer 352 to at least the surface of the magnetic disk. A layer thickness of the main heating magnetic pole layer 350 at an end 350a on the side of the slider end surface 211 becomes smaller than that of other portion. As a result, the main heating magnetic pole layer 350 can generate the high-frequency magnetic field for fine heating corresponding to a record track with minute.

Also, the heating coil layer 352 is formed in such a manner that it passes through at least between the main heating magnetic pole layer 350 and the auxiliary heating magnetic pole layer 354 between one turn. The number of turns of the heating coil layer 352 is set by considering necessary high-frequency magnetic field intensity. A heating coil insulation layer 352 surrounds the heating coil layer 352, and is provided for electrically insulating between the heating coil layer 352, and the main heating magnetic pole layer 350 and the auxiliary heating magnetic pole layer 354. Further, the heating coil layer 352 is a monolayer in FIG. 2, however may have a two or more layered structure or a helical coil shape.

Furthermore, a cross-section surface of the auxiliary heating magnetic pole layer 354 in a end 354a on the side of the slider end surface 211 is wider than the other portion of the auxiliary heating magnetic pole layer 354, and is opposed to the end 350a of the main heating magnetic pole layer 350 via a gap layer. Providing such end 354a, the magnetic slope between the end 350a and the end 354a near the slider end surface 211 is steeper. As a result, it is possible to more locally apply the high-frequency magnetic field to the magnetic disk.

As above-described, a structure of the heating coil element 35 is the same as a structure of the write coil element for a perpendicular magnetic recording, and is very appropriate to locally generate the high-frequency magnetic field to perpendicular the surface of the magnetic disk. Further, forming the heating coil element 35 at a process for manufacturing, a conventional element formation process can use, it does not need a great task. Further, by an embodiment, it is also possible that the heating coil element 35 has same structure and same size as the write coil element 34 designed as the perpendicular magnetic recording, therefore it is possible to widely reduce a manufacturing resource because it is not necessary to add such as target material and a mask used in the process for manufacturing.

Figure 3A:
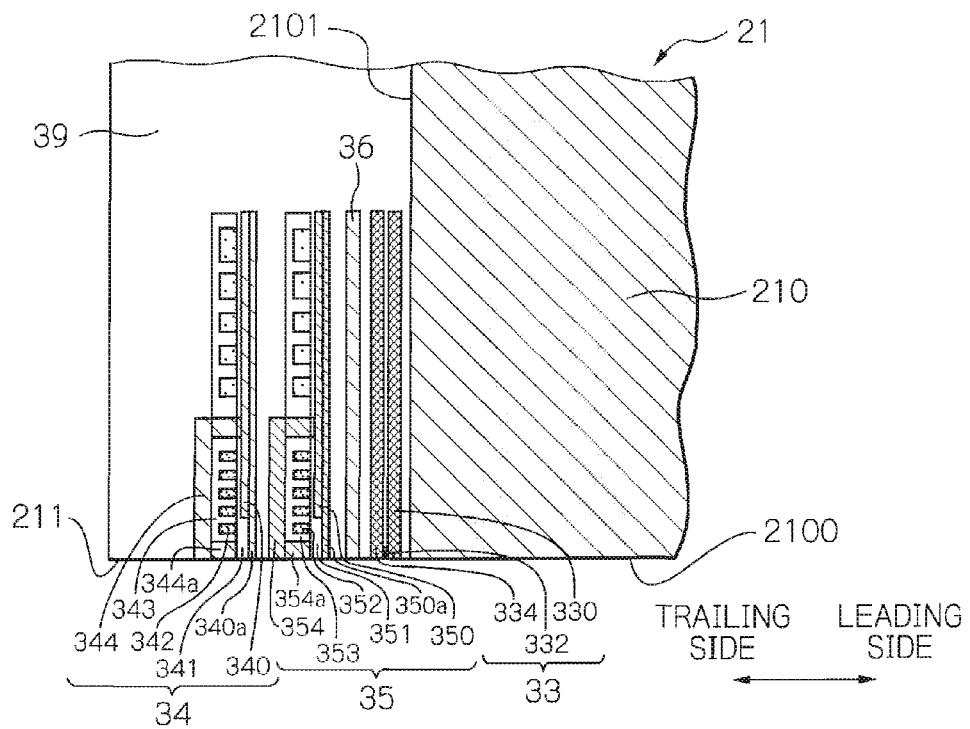
FIG. 3a shows a structure of a major portion of the thin-film magnetic head shown in FIG. 2, and shows cross sectional views taken along line A-A of FIG. 2.
Figure 3B:
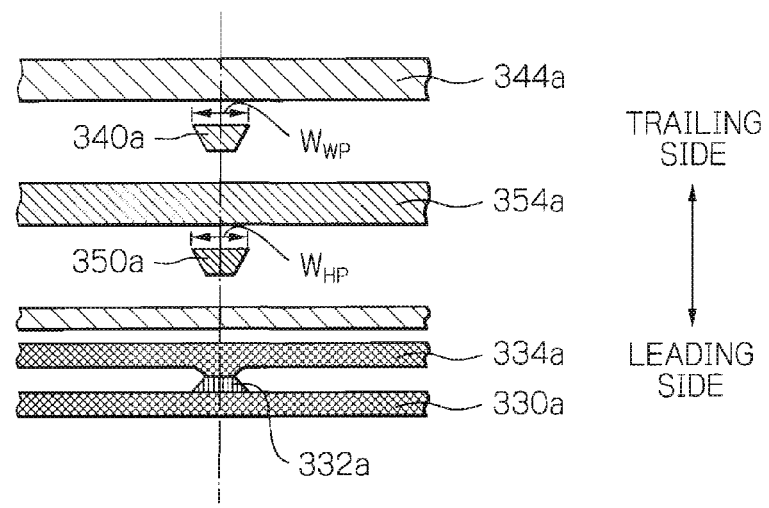
FIG. 3b shows a plain view illustrating the shape of end on the slider end surface of the MR effect element, the heating coil element, and the write coil element.

FIG. 3a shows a structure of a major portion of the thin-film magnetic head 21 shown in FIG. 2, and shows cross sectional views taken along line A-A of FIG. 2; FIG. 3b shows a plain view illustrating the shape of end on the slider end surface 211 of the MR effect element 33, the heating coil element 35, and the write coil element 34.

In FIG. 3a, the slider substrate 210 is made of AlTiC ($Al_2O_3$—TiC), etc., and has the ABS 2100 opposed to the surface of the magnetic disk 10. The MR effect element 33, the heating coil element 35, and the writing coil element 34 are formed in this order on/above an element formation surface 2101, which is a side surface when the ABS 2100 of the slider substrate 210 is at the bottom, then the overcoat layer 39 is formed such as protecting these elements.

The MR effect element 33 includes an MR effect multilayer 332, and a lower shield layer 330 and an upper shield layer 334 sandwiching the MR effect multilayer 332. The lower shield layer 330 and the upper shield layer 334 can form of NiFe, CoFeNi, CoFe, FeN, or FeZrN with a thickness of approximately 0.5-3 μm by using a pattern plating method such as frame plating.

The MR effect multilayer 332 includes a current-in-plane (CIP) giant magnetoresistive (GMR) effect multilayered film, a current-perpendicular-to-plane (CPP) GMR effect multilayered film, or a tunnel magnetoresistive (TMR) effect multilayered film, and senses a signal field from the magnetic disk with an extremely high sensitivity. The upper and lower shield layers 334 and 330 prevent the MR effect multilayer 332 from receiving an external magnetic field that causes noise.

If the MR effect multilayer 332 includes a CIP-GMR effect multilayered film, upper and lower shield gap layers for insulation are provided between the MR effect multilayer 332 and respective upper and lower shield layers 334 and 330. Further, an MR lead conductor layer is formed for supplying a sense current to the MR effect multilayer 332 and bringing out a reproduction output. On the other hand, when the MR effect multilayer 332 includes a CPP-GMR effect multilayered film or a TMR effect multilayered film, the upper and lower shield layers 334 and 330 also function as upper and lower electrodes, respectively. In this case, the upper and lower shield gap layers and the MR lead conductor layer are not needed and are omitted. Though not shown in the figure, an insulating layer is formed between the upper and lower shield layers opposed to the slider end surface 211 of the MR effect multilayer 332, and further, insulating layers, or bias insulating layers and hard bias layers which consist of a ferromagnetic material, for applying a bias magnetic field for stabilization of a magnetic-domain, may be formed on both sides along the track-width direction of the MR effect multilayer 332.

If the MR effect multilayer 332 includes for example the tunnel magnetoresistive (TMR) effect multilayered film, it has a stacked structure of an antiferromagnetic layer formed of IrMn, PtMn, NiMn, RuRhMn, etc., with a thickness of approximately 5-15 nm; a pinned layer whose magnetization direction is fixed by the antiferromagnetic layer and which consists of CoFe, etc., which is a ferromagnetic material, or two layers CoFe, etc., sandwiching the non-magnetic metal material such as Ru or CoFe; a tunnel barrier layer which consists of non-magnetic dielectric material that a metal layer formed of Al, AlCu, Mg, etc., with a thickness of approximately 0.5-1 nm is oxidized by natural oxidation or oxygen in a vacuum apparatus; and a free layer which is coupled with the pinned layer by tunnel exchange coupling through the tunnel barrier layer and which consists of, for example, a two layers of CoFe, etc., which is the ferromagnetic material, with a thickness of approximately 1 nm and NiFe, etc., which is the ferromagnetic material, with a thickness of approximately 3-4 nm, in this order.

The heating coil element 35 includes the main heating magnetic pole layer 350, a heating gap layer 351, a heating coil layer 352, a heating coil insulation layer 353, and the auxiliary heating magnetic pole layer 354. The main heating magnetic pole layer 350 is formed of, for example, an alloy of two or three elements selected from a group consisting of Ni, Fe, and Co, or an alloy of the two or three elements to which at least one appropriate element is added by using such as frame plating or sputtering, with a thickness of approximately 0.01-0.5 µm in the end portion on the ABS side and with a thickness of approximately 0.5-3.0 µm in the other portion. The heating gap layer 351 is formed of, for example, Al₂O₃ or DLC (diamond-like carbon), with thickness of approximately 0.01 -0.5 µm by using a method such as sputtering or CVD. The heating write coil layer 352 is formed of, for example, Cu with a thickness of approximately 0.5 µm-3 µm by a method such as frame plating. The heating coil insulating layer 353 is formed of, for example, a heat-cured resist with a thickness of approximately 0.1-5 µm. The auxiliary heating magnetic pole layer 354 is formed of, for example, an alloy of two or three elements selected from a group consisting of Ni, Fe and Co, or an alloy of the two or three elements to which at least one appropriate element is added, with a thickness of approximately 0.5-5 µm by using such as frame plating or sputtering.

The write coil element 34 is for perpendicular magnetic recording in this embodiment, and includes a main magnetic pole layer 340, a gap layer 341, a write coil layer 342, a write coil insulation layer 343, and an auxiliary magnetic pole layer 344. The main magnetic pole layer 340 is a magnetic path to guide and converge the magnetic flux excited by currents flowing through the write coil layer 342 to the magnetic recording layer of the magnetic disk. The thickness of the main magnetic pole layer 340 in an end 340a on the side of the slider end surface 211 becomes smaller than that of the other portions. As a result, the main magnetic pole layer 340 can generate a fine write field corresponding to higher density recording.

The write coil layer 342 is formed in such a manner that it passes at least between the main magnetic pole layer 340 and the auxiliary magnetic pole layer 344 between one turn. The coil insulating layer 343 surrounds the write coil layer 342, is provided for electrically insulating between the write coil layer 342, and the main magnetic pole layer 340 and the auxiliary magnetic pole layer 344. Further, the write coil layer 342 is a monolayer in FIG. 2, however may have a two or more layered structure or a helical coil shape.

An end on the side of the slider end surface 211 of the auxiliary magnetic pole layer 344 becomes a trailing shield portion 344a whose cross-section layer is wider than that of the other portion of the auxiliary magnetic pole layer 354. The trailing shield portion 344a is opposed to the end 340a of the main magnetic pole layer 340 via a gap layer 341. Providing such trailing shield portion 344a, the magnetic slope between the trailing shield portion 344a near the slider end surface 211 and the end 340a of the main magnetic pole layer 340 is steeper. As a result, a read error rate can become smaller as the signal output become smaller.

Here, the main magnetic pole layer 340, the gap layer 341, the write coil layer 342, the write coil insulation layer 343 and the auxiliary magnetic pole layer 344 may have a same structure as the main heating magnetic pole layer 350, the heating gap layer 351, the heating coil layer 352, the heating coil insulation layer 353 and the auxiliary heating magnetic pole layer 354 of above mentioned the heating coil element 35, respectively.

Also in FIG. 2, reference numeral 36 functions as a magnetic shield between the heating coil element 35 and the MR effect element 33, for example, it is a shielding-between-elements layer which consist of the soft-magnetic material such as permalloy (NiFe) The shielding-between-elements layer 36 can also function as a heat insulation layer for preventing heat adverse influences to the MR effect element 33 from the heating coil 35 element adjusting the shape and the size or using low heat conduction material such as insulation.

Further, though not shown in the figures, in other embodiments, a backing coil element may be formed between the shielding-between-elements layer 36 and the heating coil element 35 or between the heating coil element 35 and the writing coil element 34. The backing coil element consists of a backing coil layer and a backing coil insulation layer, and the backing coil element suppresses the wide area adjacent-track erase (WATE) behavior which is an unwanted write or erasing operation to the magnetic disk, by generating a magnetic flux for negating the magnetic loop that arises from the main magnetic pole layer 340 and the auxiliary magnetic pole layer 344 through the upper and lower shield layers of the MR effect element 33.

As shown in FIG. 3b, on the slider end surface 211, an end 332a of the MR effect multilayer 332, an end 350a of the main heating magnetic pole layer 340, and an end 340a of the main magnetic pole layer 340 is arranged along a same straight line of track direction, in this order. In short, the end 350a positions on the leading side of the end 340a. Further, as the end 350a and the end 340a are much close to each other, it is possible to apply the write magnetic field, just after heating a predetermined portion of the magnetic disk. Therefore, a stable heat-assisted write operation can be surely performed.

Further, both shapes of the end 350a and the end 340a on the slider end surface 211 are shapes of inverted trapezoid with a longer edge on the trailing side. That is to say, a bevel angle is set for avoiding unwanted applying the high-frequency magnetic field and writing to the adjacent tracks due to a skew angle derived from driving of a rotary actuator. The amount of the bevel angle is, for example, approximately 15° (degrees). At this shape of inverted trapezoid, in fact, the high-frequency magnetic field or the write magnetic field for heating is mainly generated near the longer edge on the trailing side and therefore, the length of the longer edge mainly determines the written width (track width) and the width of a heating ranges.

Here, the relation between the length $W_{HP}$ of the longer edge on the trailing side in the end 350a of the main heating magnetic pole layer 350 and the length $W_{WP}$ of the longer edge on the trailing side in the end 340a of the main magnetic pole layer 340 will be considered below.

Generally, the heat-assisted magnetic recording method is classified into a magnetically dominant type and a thermally dominant type. In the case of the magnetically dominant type, the width heated to reduce the coercive force $H_C$ sufficiently (heated width) is set to become larger than the width to which the write magnetic field is applied (applied width) in the magnetic recording layer of the magnetic disk. That is, the lengths $W_{HP}$ and $W_{WP}$ have a relation of $W_{HP}=W_{WP}$, and the written width (track width) becomes equivalent to the applied width. On the contrary, in the case of the thermally dominant type, the heated width is set to become the same as or smaller than the applied width. That is, the lengths $W_{HP}$ and $W_{WP}$ have a relation of $W_{HP}<W_{WP}$, and the written width (track width) becomes equivalent to the heated width.

The above-described heat-assisted magnetic recording method has a possibility to achieve a much higher recording density by writing the magnetic disk with high coercive force to micrify recording bits.

The writing coil element 34 may be for longitudinal recording. In this case, a lower magnetic pole layer and an upper magnetic pole layer are provided instead of the main magnetic pole layer 340 and the auxiliary magnetic pole layer 344. Further, a write gap layer is provided, which is sandwiched between the end on the side of the slider end surface 211 of the lower magnetic pole layer and that of the upper magnetic pole layer. A leakage magnetic field from a position of the write gap layer performs a write operation onto the magnetic disk.

Figure 4:
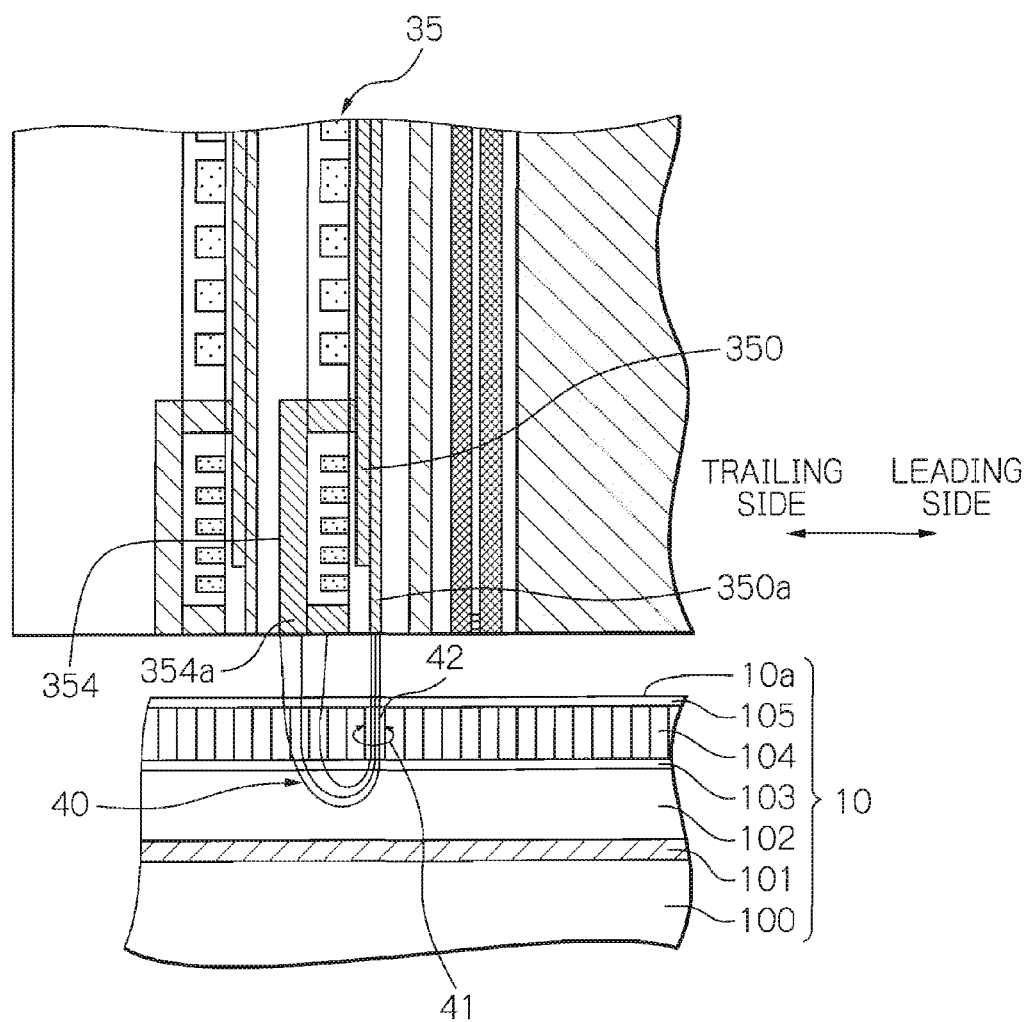
FIG. 4 shows a cross-sectional view of the heating coil element and the magnetic disk for explaining a principle heating the magnetic recording medium in the heat-assisted magnetic recording method according to the present invention.

The FIG. 4 shows a cross-sectional view of the heating coil element 35 and the magnetic disk 10 for explaining a principle heating the magnetic recording medium in the heat-assisted magnetic recording method according to the present invention.

First, by using FIG. 4, the structure of the magnetic disk 10 will be explained. The magnetic disk 10, for a perpendicular magnetic recording in this embodiment, has a multilayered structure that a magnetization-aligning layer 101, a soft-magnetic backing layer 102 acting as a part of magnetic loop, an intermediate layer 103, a perpendicularly recording layer 104, and a protecting layer 105 are sequentially stacked in this order on a disk substrate 100. The magnetization-aligning layer 101 stabilizes magnetic domains of the soft-magnetic backing layer 102 and suppresses a spike noise in a reproducing output waveform by applying anisotropic magnetic fields in the track-width direction thereto. The intermediate layer 103 acts as a base coat for adjusting the magnetic alignment and the grain size of the perpendicularly recording layer 104.

The disk substrate 100 consists of glass, NiP-coated Al alloy, Si, etc. The magnetization-aligning layer 101 consists of PtMn, etc., which is the antiferromagnetic material. The soft-magnetic backing layer 102 consists of Co-type amorphous alloy such as CoZrNb which is the soft-magnetic material, Fe alloy, soft-magnetic ferrite, or a multilayer of a soft-magnetic film/a non-magnetic film. The intermediate layer 103 consists of Lu allay which is a non-magnetic material. The intermediate layer 103 may consist of an other antiferromagnetic metal or alloy, or a low magnetic permeability alloy in the case where perpendicular anisotropic magnetic fields of the perpendicularly recording layer 104 can control. The protecting layer 105 consists of a carbon material formed by the CVD method.

Also, in the case of selection of a material which the perpendicularly recording layer 104 consists of, it is considered that an eddy current loss, which is a heating value by the eddy current, becomes large enough. Also, it is necessary to fully suppress a hysteresis loss so as to stabilize the magnetic domains of the recording bits. Generally, the eddy current loss is proportional to a square of the frequency f of applied magnetic fields, and is inversely proportional to a resistivity $\rho$ of the magnetic material. Also, the eddy current loss becomes large as permeability $\mu m$ is high. Therefore, a high permeability magnetic material whose resistivity $\rho$ is low, for example, an artificial grating multilayer film of CoCrPt-type alloy, FePt-type alloy, or CoPt/Pd-type alloy is selectable for the material which the perpendicularly recording layer 104 consists of. Also, a conductive oxide magnetic material, for example, barium ferrite having a predetermined conductivity by adding an element or by controlling an oxygen fault, or a material which includes ferromagnetic particles such as CoPt in conductive oxide-type material in matrix pattern may be selectable.

As shown in FIG. 4, a magnetic flux 40 corresponding to the high-frequency magnetic field passes through the perpendicular recording layer 104 from the end 350a of the main heating magnetic pole layer 350 of the heating coil element 35 with extremely high flux density and then returns the end 354a of the auxiliary heating magnetic pole layer 354 through a soft-magnetic backing layer 102, spreading up to rather low flux density. Hereby, the magnetic flux 40 forms the magnetic loop with magnetic paths in the main heating magnetic pole layer 350 and the auxiliary heating magnetic pole layer 354.

Now, the portion heated by the eddy current loss caused due to an occurrence of the eddy current mainly becomes a portion 42 of the perpendicularly recording layer 104 where the flux density of the flux 40 becomes duly high. As the portion 42 is heated by eddy current 41 generated in the portion 42, the coercive force $H_C$ of the portion 42 reduces a writable predetermined value. Next, after this heating or before the coercive force $H_C$ re-exceeds a permitted value as a temperature of the portion 42 decreases by the radiation, the data signals are written by the writing coil element.

Figure 5A:
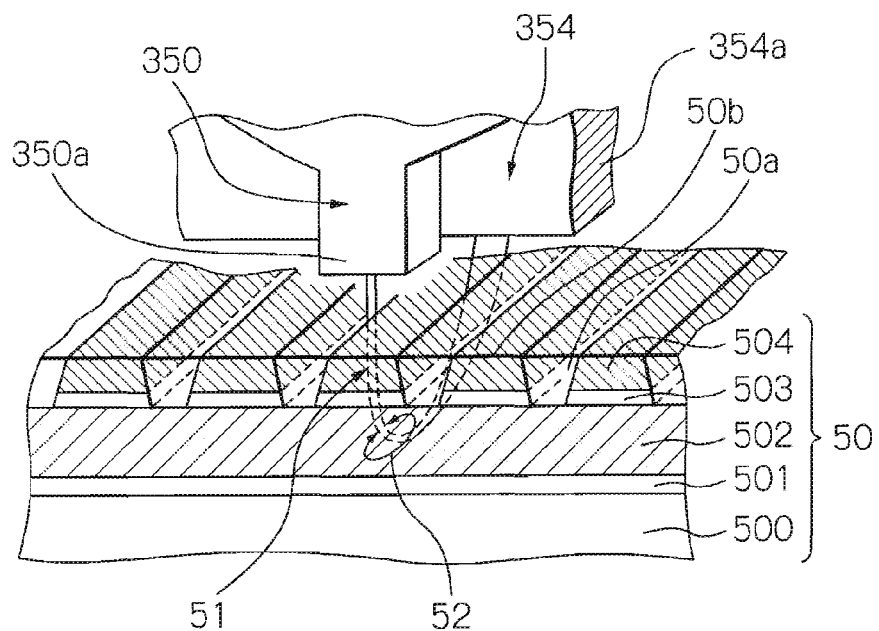
FIGS. 5a and 5b show a schematic diagram showing an embodiment using a discrete track medium and a patterned medium in the heat-assisted magnetic recording method according to the present invention.
Figure 5B:
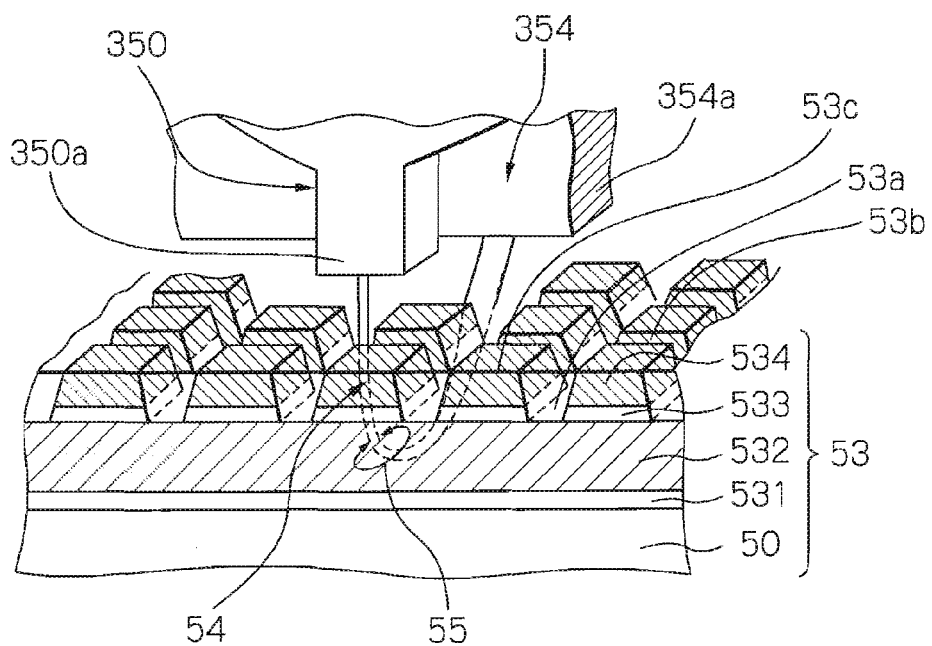

Each of FIG. 5a and FIG. 5b shows a schematic diagram showing an embodiment using a discrete track medium and a patterned medium in the heat-assisted magnetic recording method according to the present invention.

As shown in FIG. 5a, in the discrete track medium 50, a plurality of discrete tracks 50b are formed by the perpendicular magnetic recording layer 504 and the intermediate layer 503 being divided with a non-magnetic isolated layer 50a which consists of a non-magnetic material stretched to a longitudinal direction. That is to say, the discrete track medium 50 is the one of the magnetic disk to plan a high track density.

In the discrete track medium 50 provided with this discrete track 50b, the eddy current 52 generated by the flux 51 from the end 350a of the main heating magnetic pole layer 350 is inducted more in a soft-magnetic backing layer 502 than a perpendicularly recording layer 504 (and an intermediate layer 503) which the domain in the track-width direction is limited. Therefore, a main heating area with the magnetic flux 51 is a portion of the soft-magnetic backing layer 502, and then it is possible to selectively heat a portion of the perpendicularly recording layer 504 limited in the track-width direction, which is the upper of that portion. This selective heating widely contributes higher-density recording in the heat-assisted magnetic recording.

Further, using the discrete track medium 50 in the heat-assisted magnetic recording method according to the present invention, at a material design of the perpendicular magnetic recording layer 504, there is no limitation about a generation efficiency of the eddy current, and then it expands the scope the material selection. For example, it can select a high resistivity $\rho$ material such as oxide magnetic material represented the barium ferrite.

Next, as shown in FIG. 5b, in the patterned medium 53, a plurality of discrete tracks are formed by the perpendicular magnetic recording layer 534 and the intermediate layer 533 being divided with a non-magnetic isolated layer 53a which consists of a non-magnetic material stretched to a longitudinal direction, and a plurality of perpendicular magnetic recording portion 53c are formed by each of the discrete track being divided with a non-magnetic isolated layer 53b. A plurality of the discrete tracks are very fine magnetic material patterns, and correspond to one recording bit, respectively. That is to say, the patterned medium 53 decreases interference of the signal field not only between tracks but also between the recording bits, and may achieve the higher-density recording than the discrete track medium.

In the patterned medium 53 provided with this perpendicular magnetic recording portion 53c, the eddy current 55 generated the flux 54 from the end 350a of the main heating magnetic pole layer 350 is inducted more in a soft-magnetic backing layer 532 than a fine perpendicularly recording layer 534 (and an intermediate layer 533) which the domain is limited. Therefore, a main heating area with the magnetic flux 54 is a portion of the soft-magnetic backing layer 532, then it is possible to selectively heat the fine perpendicularly recording layer 504 limited the domain, which is the upper of that portion. This selective heating widely contributes higher-density recording in the heat-assisted magnetic recording.

Further, using the patterned medium 53 in the heat-assisted magnetic recording method according to the present invention, at material design of the perpendicular magnetic recording layer 534, there is no limitation about a generation efficiency of the eddy current, then it expands the scope the material selection. For example, it can select a high resistivity ρ material such as oxide magnetic material represented the barium ferrite.

Further, as the patterned medium, except for above-described form, there is a single magnetic-domain structure artificially adjusted a shape or a size, for examples, microparticles arranged an array pattern, too. In these cases, each single magnetic-domain structure is recorded for one bit. In these patterned media, in the case of using the soft-magnetic backing layer, same as the patterned medium of FIG. 6b, the single magnetic-domain structure is selectively heated, then this can more prompt higher-density recording in the heat-assisted magnetic recording.

Figure 6:
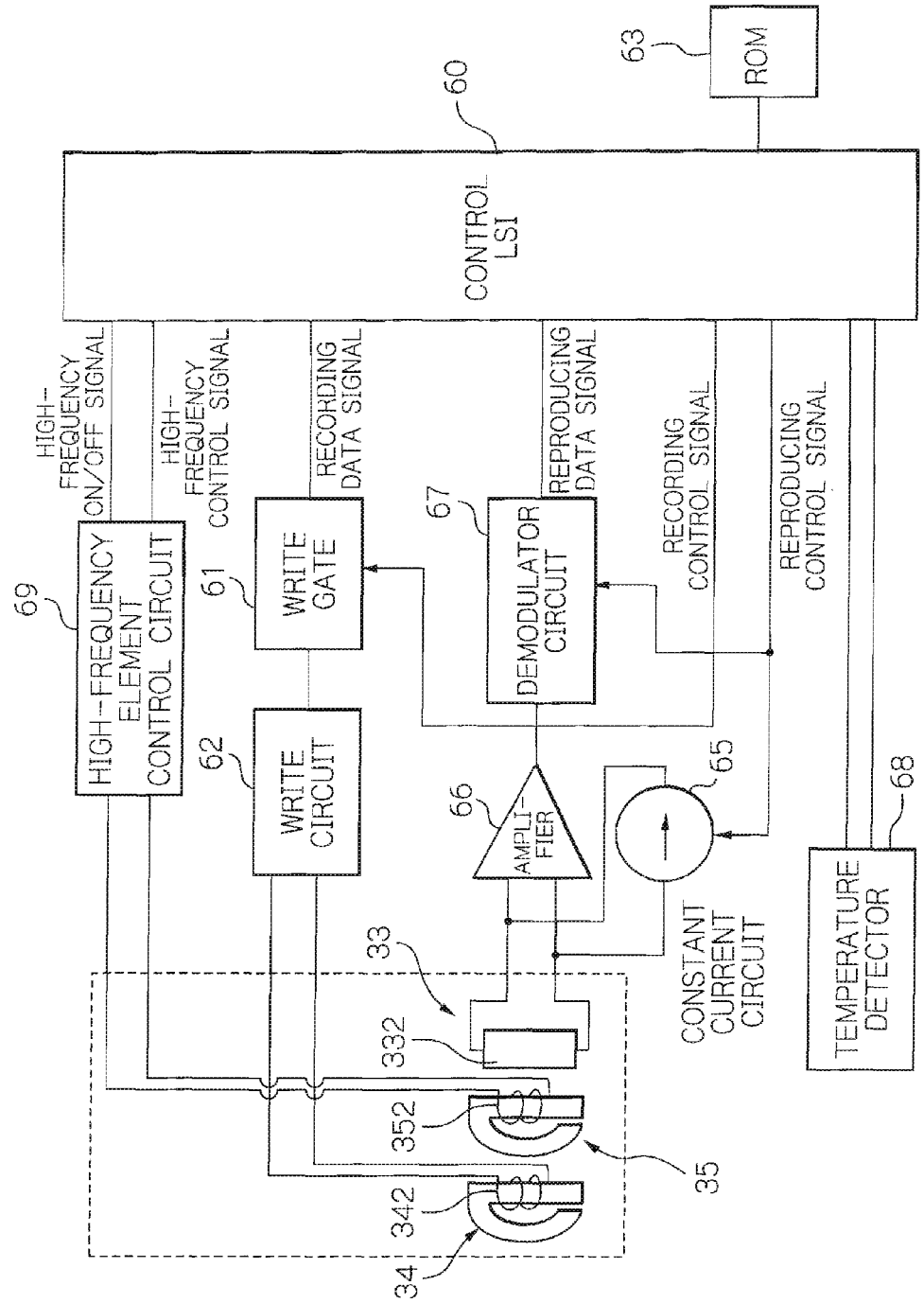
FIG. 6 shows a block diagram illustrating the circuit structure of the recording/reproducing and heating control circuit of the magnetic recording/reproducing apparatus shown in FIG. 1.

FIG. 6 shows a block diagram illustrating the circuit structure of the recording/reproducing and heating control circuit 13 of the magnetic recording/reproducing apparatus shown in FIG. 1.

In FIG. 6, reference numeral 60 indicates a control LSI, 61 indicates a write gate for receiving recording data from the control LSI 60, 62 indicates a write circuit, 63 indicates a ROM that stores a control table and so on for controlling high-frequency currents applied to the heating coil element 35, 65 indicates a constant current circuit for supplying sense currents to the MR effect element 33, 66 indicates an amplifier for amplifying the output voltage from the MR effect element 33, 67 indicates a demodulator circuit for outputting reproduced data to the control LSI 60, 68 indicates a temperature detector, and 69 indicates a high-frequency element control circuit for controlling the heating coil element 35, respectively.

The recording data that is output from the control LSI 60 is supplied to the write gate 61. The write gate 61 supplies recording data to the write circuit 62 only when a recording control signal that is output from the control LSI 60 instructs a write operation. The write circuit 62 passes write currents corresponding to this recording data through the write coil layer 342, and the writing coil element 34 writes data on the magnetic disk.

Constant currents flow from the constant current circuit 65 into the MR multilayer 332 only when the reproducing control signal that is output from the control LSI 60 instructs a read operation. The signal reproduced by this MR effect element 33 is amplified by the amplifier 66, demodulated by the demodulator circuit 67, and then, the obtained reproduced data is output to the control LSI 60.

The high-frequency element control circuit 69 receives a high-frequency ON/OFF signal and a high-frequency current control signal that are output from the control LSI 60. When the high-frequency ON/OFF signal is an ON operation instruction, a high-frequency current is applied to the heating coil layer 352 of the heating coil element 35. The high-frequency current value in this case is controlled to a value corresponding to the high-frequency current control signal. The control LSI 60 generates the high-frequency ON/OFF signals by adjusting timing according to the write operations with the write coil element 34, and determines the value of the high-frequency current control signals by referring the measured temperature values of the recording layer of the magnetic disk with the temperature detector 68 and following the control table in the ROM 63.

The control table in the ROM 63 includes data about the relation between the high-frequency magnetic field current value and the mount of temperature increased by heat-assisting in the recording layer, and data about the temperature dependence of the coercive force, as well as the temperature dependence of the high-frequency current vs. high-frequency magnetic field characteristics. Thus, it is possible to realize not only a current application to the heating coil element 35 linked with the write operations but also a more diversified current application mode by providing the high-frequency ON/OFF signals and the system of the high-frequency current value control signal independently from the recording/reproducing control signal system.

It is obvious that the circuit structure of the recording/reproducing and heating control circuit 13 is not limited to that shown in FIG. 6. For example, It is also possible to supply the heating coil element 35 linked with the write gate operations, by having high-frequency power supply in the recording/reproducing pre-amplifier.

Figure 7A:
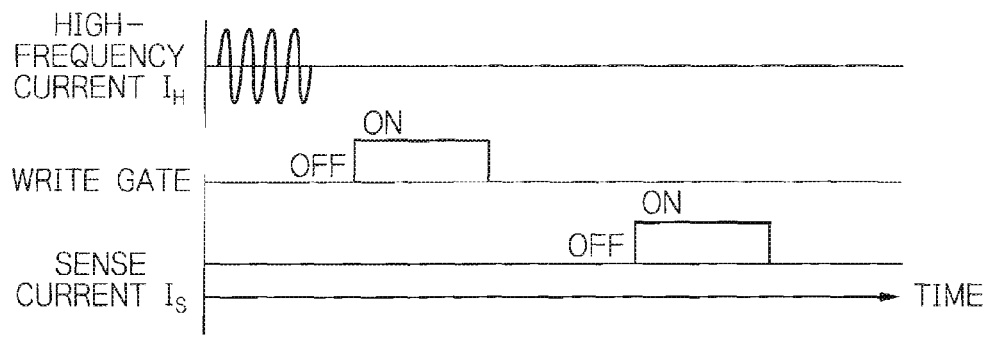
FIGS. 7a to 7c show a time chart explaining an embodiment of the heat-assisted magnetic recording method according to the present invention.
Figure 7B:
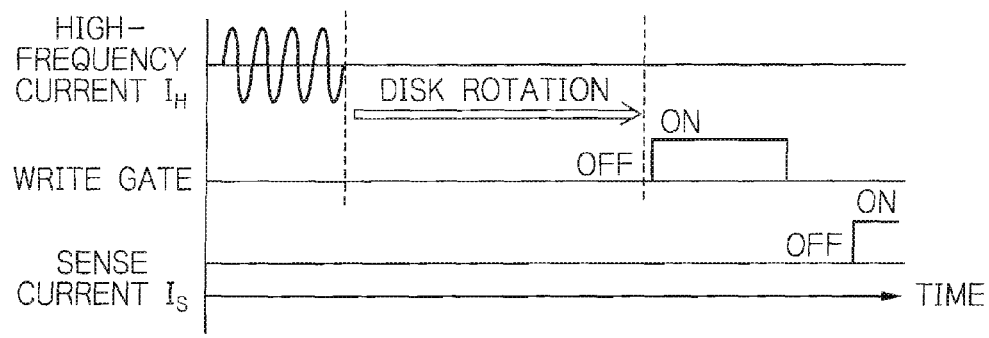
Figure 7C:
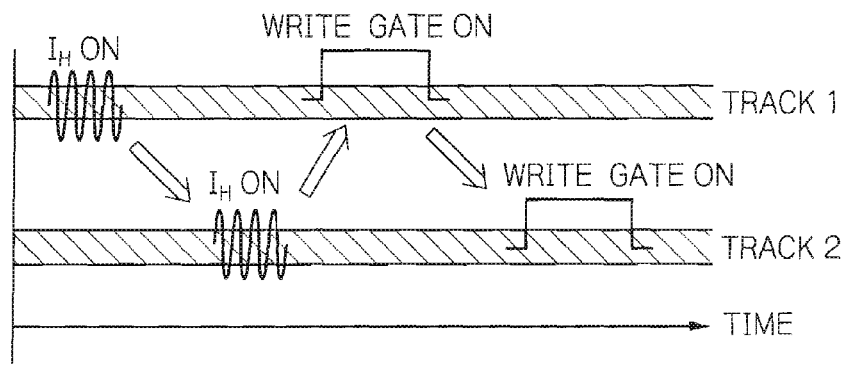

FIGS. 7a to 7c show a time chart explaining an embodiment of the heat-assisted magnetic recording method according to the present invention.

As shown in FIG. 7a, before the write operation, by applying a high-frequency current $I_H$ to the heating coil 35, the eddy current is generated at predetermined portion of the magnetic recording layer of the magnetic disk by applying the high-frequency magnetic fields whose frequency is, for example, approximately 80-500 MHz, and whose amplitude is, for example, approximately 8-12 kOe (640-960 kA/m) at the portion of the perpendicular magnetic recording layer. Hereby, this predetermined portion is heated to, for example, approximately 300-350° C., and this coercive force $H_C$ decrease to, for example, approximately 2 k-8 kOe (160-640 kA/m).

Just after this application of the high-frequency magnetic field, that is to say, at the moment or just before the heating portion of the magnetic recording layer has reached below the main magnetic pole layer of the writing coil element 34 with the magnetic disk slightly rotating, the write gate has changed an ON state, then the write operation with the writing coil element 34 starts. In this case, as shown in FIG. 2, it is prefer to use the thin-film magnetic head that the heating coil element is positioned on the leading side of the writing coil element. Further, in the case of this head, it is possible to independently perform an optimum structure design of the heating coil element and the writing coil element, respectively. After finishing the write operation, the read operation is performed with the MR effect element 33.

Next, other embodiments will be explained. As shown in FIG. 7b, before the write operation, by applying a high-frequency current $I_H$ to the heating coil 35, the eddy current is generated at predetermined portion of the magnetic recording layer of the magnetic disk by applying high-frequency magnetic fields similar to the case of FIG. 7a. Hereby, this predetermined portion is heated, and this coercive force $H_C$ decreases similar to the case of FIG. 7a.

After finishing this application of the high-frequency magnetic field, then waiting until the magnetic disk rotates one or more rounds, at the moment or just before the heating portion of the magnetic recording layer has reached below the main magnetic pole layer of the writing coil element 34, the write gate has changed an ON state, then the write operation with the writing coil element 34 starts. In this case, the heating coil element is not limited to the form of FIG. 2, for examples, it is possible to use a head that the heating coil element is positioned on the leading side of the writing coil element. But in the case of writing with the writing coil element 34, it is necessary to be a state that the coercive force $H_C$ does not reduces a permitted value by cooling the magnetic disk with the rotation. After finishing the write operation, the read operation is performed with the MR effect element 33.

Also, in this case, as shown in FIG. 7c, after heating a predetermined portion of track 1, then heating a predetermined portion of track 2, then data may be write in the heating portion of the track 1 and 2, in this order. And, after heating each of two different sectors on the same track, then data may be write in the heating sectors. Further, if the coercive force $H_C$ does not reduce a permitted value, it is possible to mix the heat operation and the write operation at between three or more tracks or sectors.

Further, in the embodiments shown in FIGS. 7a to 7c, it is possible to use the thin-film magnetic head which is provided with one writing (heating) coil element performing both a application of the high-frequency magnetic fields and a application of the write magnetic field. In this case, it is necessary to favorably design structure of the element for exercising both functions.

According to the heat-assisted magnetic recording method of the present invention indicated the embodiment in FIGS. 7a to 7c, without the optical system such as a laser source, a lens system and a near-field light generation element, it can heat the magnetic disk, efficiently, locally, and instantly. As a result, it contributes not only the increasing capacity and decreasing size at the heat-assisted magnetic recording but also the reduction of the recording time.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head for a heat-assisted magnetic recording comprising:
    a heating coil element comprising:
        a main heating magnetic pole layer for applying a high-frequency magnetic field perpendicular to a surface of a magnetic recording medium,
        an auxiliary heating magnetic pole layer of which one end is near one end of said main heating magnetic pole layer, and another end is magnetically connected to another end of said main heating magnetic pole layer, and
        a heating coil layer for generating a magnetic flux in said main heating magnetic pole layer and said auxiliary heating magnetic pole layer and passing through at least between said main heating magnetic pole layer and said auxiliary heating magnetic pole layer;
    a write head element for writing data signals by generating a signal magnetic field, the write head element being a writing coil element for a perpendicular magnetic recording, and comprising:
        a main magnetic pole layer for applying a write magnetic field to perpendicular the surface of the magnetic recording medium;
        an auxiliary magnetic pole layer of which one end is near one end of said main magnetic pole layer, and another end is magnetically connected to another end of said main magnetic pole layer; and
        a write coil layer for generating a magnetic flux in said main magnetic pole layer and said auxiliary magnetic pole layer and passing through at least between said main magnetic pole layer and said auxiliary magnetic pole layer; and
    a read head element for reading data signals by sensing the signal magnetic field,
    wherein said read head element, said heating coil element, and said write head element are stacked in this order from an element-formed surface of a substrate.

2. A head gimbal assembly comprising:
    a thin-film magnetic head comprising:
        a heating coil element comprising:
            a main heating magnetic pole layer for applying a high-frequency magnetic field perpendicular to a surface of a magnetic recording medium,
            an auxiliary heating magnetic pole layer of which one end is near one end of said main heating magnetic pole layer, and another end is magnetically connected to another end of said main heating magnetic pole layer, and
            a heating coil layer for generating a magnetic flux in said main heating magnetic pole layer and said auxiliary heating magnetic pole layer and passing through at least between said main heating magnetic pole layer and said auxiliary heating magnetic pole layer;
        a write head element for writing data signals with generating a signal magnetic field, the write head element being a writing coil element for a perpendicular magnetic recording, and comprising;
            a main magnetic pole layer for applying a write magnetic field to perpendicular the surface of the magnetic recording medium;
            an auxiliary magnetic pole layer of which one end is near one end of said main magnetic pole layer, and another end is magnetically connected to another end of said main magnetic pole layer; and
            a write coil layer for generating a magnetic flux in said main magnetic pole layer and said auxiliary magnetic pole layer and passing through at least between said main magnetic pole layer and said auxiliary magnetic pole layer, and
        a read head element for reading data signals by sensing the signal magnetic field,
        wherein said read head element, said heating coil element, and said write head element are stacked in this order from an element-formed surface of a substrate;
    a support mechanism for supporting said thin-film magnetic head;
    trace conductors for said write head element;
    trace conductors for said read head element; and
    trace conductors for a high-frequency magnetic field generation element.

3. A magnetic recording/reproducing apparatus comprising:
    at least one head gimbal assembly comprising:
        a thin-film magnetic head comprising:
            a heating coil element comprising:
                a main heating magnetic pole layer for applying a high-frequency magnetic field perpendicular to a surface of a magnetic recording medium,
                an auxiliary heating magnetic pole layer of which one end is near one end of said main heating magnetic pole layer, and another end is magnetically connected to another end of said main heating magnetic pole layer, and
                a heating coil layer for generating a magnetic flux in said main heating magnetic pole layer and said auxiliary heating magnetic pole layer and passing through at least between said main heating magnetic pole layer and said auxiliary heating magnetic pole layer;

a write head element for writing data signals by generating a signal magnetic field, the write head element being writing coil element for a perpendicular magnetic recording, and comprising:

a main magnetic pole layer for applying a write magnetic field to perpendicular the surface of the magnetic recording medium;

an auxiliary magnetic pole layer of which one end is near one end of said main magnetic pole layer, and another end is magnetically connected to another end of said main magnetic pole layer; and a write coil layer for generating a magnetic flux in said main magnetic pole layer and said auxiliary magnetic pole layer and passing through at least between said main magnetic pole layer and said auxiliary magnetic pole layer, and a read head element for reading data signals by sensing the signal magnetic field, wherein said read head element, said heating coil element, and said write head element are stacked in this order from an element-formed surface of a substrate;

a support mechanism for supporting said thin-film magnetic head;

trace conductors for said write head element;

trace conductors for said read head element; and trace conductors for a high-frequency magnetic field generation element;

at least one magnetic recording medium; and a recording/reproducing and heating control circuit for controlling read and write operations of said thin-film magnetic head to said at least one magnetic recording medium and for controlling a heat operation of said high-frequency magnetic field generation element.

4. The magnetic recording/reproducing apparatus as claimed in claim 3, wherein said at least one magnetic recording medium comprises a magnetic recording layer and a soft-magnetic backing layer set below said magnetic recording layer.

5. The magnetic recording/reproducing apparatus as claimed in claim 4, wherein said at least one magnetic recording medium is a discrete track medium or a patterned medium.

* * * * *